United States Patent [19]
Voss et al.

[11] Patent Number: 5,871,414
[45] Date of Patent: Feb. 16, 1999

[54] ADJUSTING AND FIXING DEVICE FOR SEATS, LIKE AUTOMOBILE SEATS, IN PARTICULAR FOR THE ADJUSTMENT OF THE BACK REST

[75] Inventors: Heinz Voss, Leverkusen; Ulrich Lehmann, Bonn, both of Germany

[73] Assignee: Keiper Recaro GmbH & Co., Remscheid, Germany

[21] Appl. No.: 752,315

[22] Filed: Nov. 19, 1996

[30] Foreign Application Priority Data

Dec. 27, 1995 [DE] Germany ............... 195 48 809.1

[51] Int. Cl.$^6$ ............................................. F16H 1/32
[52] U.S. Cl. ........................................ 475/175; 475/162
[58] Field of Search ................... 475/162, 177, 475/175; 297/362; 192/8 R

[56] References Cited

U.S. PATENT DOCUMENTS

| | | | |
|---|---|---|---|
| 4,371,207 | 2/1983 | Wilking et al. | 475/162 |
| 4,786,110 | 11/1988 | Mahling et al. | 297/362 |
| 5,154,475 | 10/1992 | Kafitz | 475/175 X |
| 5,277,267 | 1/1994 | Droulon et al. | 475/177 X |
| 5,308,294 | 5/1994 | Wittig et al. | 475/162 |
| 5,553,922 | 9/1996 | Yamada | 297/362 |
| 5,586,833 | 12/1996 | Vossmann | 475/177 |
| 5,634,380 | 6/1997 | Scholz et al. | 297/368 |
| 5,634,689 | 6/1997 | Putsch et al. | 475/162 |

*Primary Examiner*—Charles A. Marmor
*Assistant Examiner*—Ankur Parekh
*Attorney, Agent, or Firm*—McAulay Nissen Goldberg Kiel & Hand, LLP

[57] ABSTRACT

Adjusting and fixing device for seats, like automobile seats, in particular for the adjustment of the back rest. For the adjustment of the back rest vis-à-vis the seat part a fixed mounting is arranged at the seat part. This fixed mounting is joined with an adjustable mounting for the back rest transferring the adjusting movement over a gearing drivable by means of a cam section, defining the position of these mountings related to each other. The gearing includes a radial tooth wheel belonging to a mounting and an internal gear rim of the other mounting catching into the first one, whereby counter toothings are arranged at the mountings. The cam section is formed by two wedge segments inclined against each other and encompassing the bearing point of the adjustable mounting regionally. The wedge sections are wrapped around by the bearing point of the fixed mounting, whereby the narrow sides of the wedge segments can be charged by the arm of a driver designed as a bush, whereas a force accumulator pressing the wedge away from each other for radial play reduction catches between the broad sides of the wedge segments. For the prevention of the afflux of the mounting joined with the back rest during a time period marked by vibration and impacts and dynamic operational conditions a locking ring is arranged in the radial plane between the wedge segments and the driver. This locking ring contains at its outer periphery at least one check nose, which can catch into the counter toothing of the fixed mounting. This check nose is held in the engaged position in the counter toothing by a spring element supporting itself at the bearing points of the fixed mounting, this spring element being incident to the locking ring. The check nose, however, can be driven out of the counter toothing by stops of the driver during the rotational movement of the same.

9 Claims, 5 Drawing Sheets

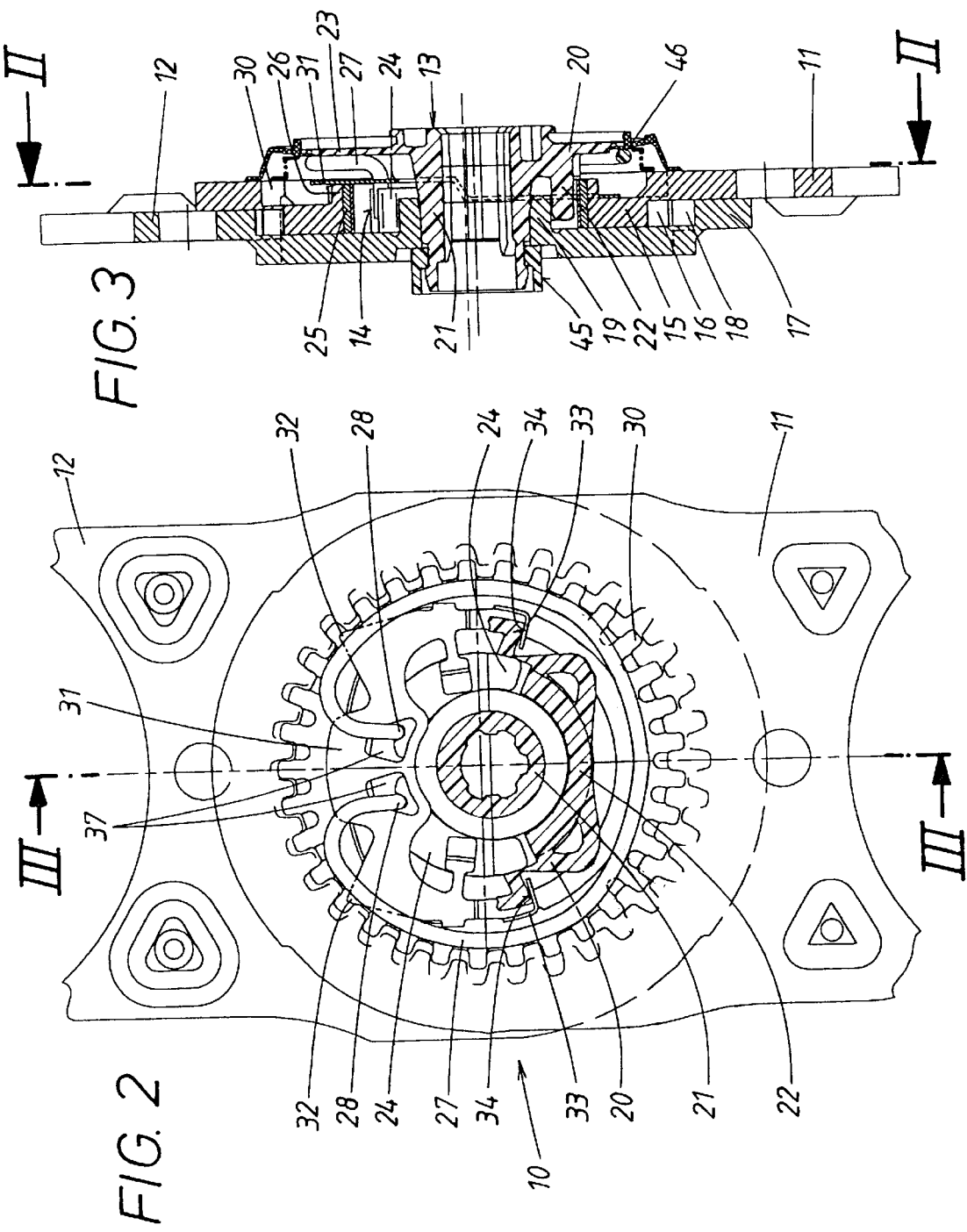

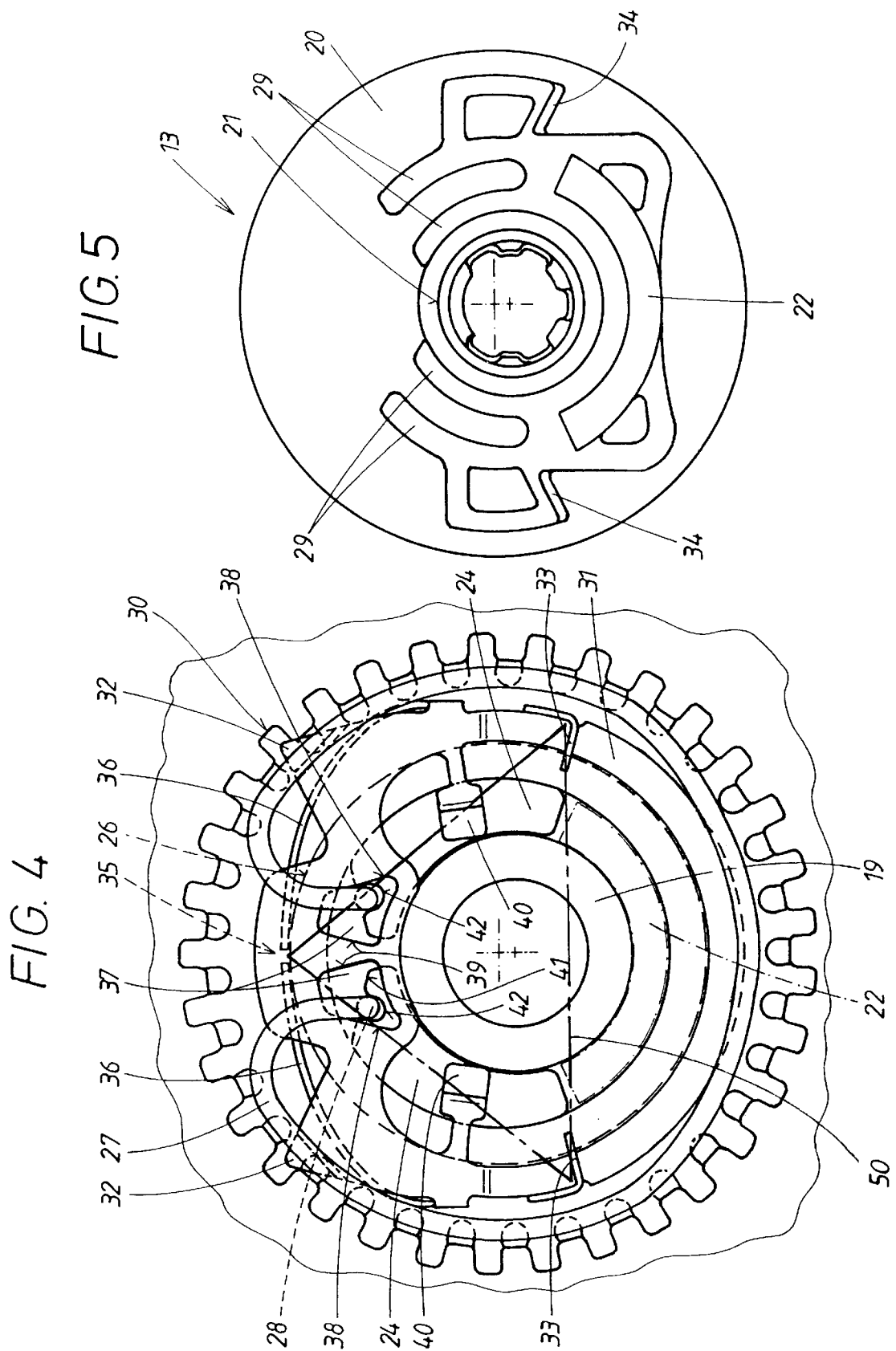

ADJUSTING AND FIXING DEVICE FOR SEATS, LIKE AUTOMOBILE SEATS, IN PARTICULAR FOR THE ADJUSTMENT OF THE BACK REST

BACKGROUND OF THE INVENTION a) Field of the Invention

This invention relates to an adjusting and fixing device for seats, like automobile seats, in particular for the adjustment of the back rest vis-à-vis the seat part, where a fixed mounting is arranged. This mounting is joined with an adjustable mounting (which transfers the adjusting movement) for the back rest by a gearing defining the position of these fittings with each other. This gearing can be driven by means of a cam section. Here the gearing is formed by a radial toothed wheel belonging to a mounting and an internal geared wheel of the other mounting catching into the other one and the counter gearings are arranged at the mountings. Here the cam section is formed by two wedge segments regionally encompassing the bearing of the adjustable mounting. These two wedge segments are inclined against each other. The wedge segments are encompassed by the bearing of the fixed mounting and the narrow sides of the wedge segments can be admitted by the arm of a driver designed as bearing bush, whereas an energy accumulator pressing these away from each other for a radial play reduction catches between the wide sides of the wedge segments.

b) Description of the Related Art

An adjusting and fixing device for seats of the type described at the outset is known from the DE 44 36 101 A1. Here a bush type driver with an arm formed single piece as it catches between the narrow sides of the wedge segments forming a cam section. The wedge segments are pressed away from each other by an energy accumulator at their broad sides. Thus an adjustment of the cam section can be achieved at the tolerance running through during the adjustment movement in the bearing as well as in the toothing and with that a radial play reduction is made possible. In the case of this previously known solution the single piece design of the driver simplifies indeed the production and also the assembly of the hinge brace, however, the problem of the run-off of the back rest is not solved by the power impacts applied on it during the dynamic operation of the automobile. The gearing consisting of the toothed wheels and the cam section formed by the wedge segments is indeed self locking in the case of acutely occurring load due to frictional stop, the run-off of the back rest, however, cannot be prevented absolutely in the case of repeated power impacts occurring for a longer duration of time. In the solution according to the DE 38 19 346 A1 it was already proposed to add a wrap spring brake to the hinge brace for the assured clamping of the back rest in the locked state. This wrap spring brake, however, represents an additional construction element, which requires space on the one hand and leads to a considerable rise in price of the hinge brace on the other.

OBJECT AND SUMMARY OF THE INVENTION

The primary object of this invention is to improve an adjusting and fixing device of the type as described above, that the run-off of the back rest is prevented absolutely in the locked state under operational condition of the automobile by interlocking check action of the movable components of the hinge brace by simple constructional methods. This object is solved according to this invention, wherein a locking ring is situated between the wedge segments and the driver in the radial plane. This ring has in its outer periphery at least one check nose, which can be engaged into the counter toothing of the fixed mounting. This check nose is kept in the engaging position in the counter toothing by a spring component supporting itself at the bearing position of the fixed mounting, however, can be controlled by stoppers of the driver in the case of its rotational movement from the counter toothing. This locking ring represents a simple construction part, which can be integrated easily into the gearing, which can be driven by means of the cam section. Thus the wedge segments are stopped during locked stated by form closure at the run-off. Thereby the support of the locking ring results within the encased region of the hinge brace at the toothed wheel.

In order to achieve an easy controllability of the locking ring during the commencement of an adjusting movement in the one as well as in the other direction of rotation and on the other hand to be able to absorb the stress resulting from the back rest in a secured way in the one as well as in the other direction of rotation, the locking ring is provided advantageously with two check noses arranged at a distance from each other projecting from its outer periphery. These check noses have a distance from each other suitable for the simultaneous catch in the gaps of teeth of the counter toothing of the fixed mounting. With that adjusting movement of the driver can be started in the one as well as in the other direction of rotation into the locking ring in a secured way, this has two supporting fingers projecting almost vertically from its disc plane. The stops of the driver sit close to the supporting fingers.

The spring component of the locking ring guiding back the locking ring into the catch position in the counter toothing in the case of interruption of the adjusting movement is formed advantageously by two plate spring legs directed against each other. Of those each one is joined single piece at the periphery of the locking ring on the opposite sides and supports itself on the other periphery of the bearing position of the fixed mounting. Thereby the geometry of the spring support point and the driver stops are chosen in such a way, that the support center of the plate spring legs on the bearing point of the fixed mounting and the supporting fingers of the locking ring adjacent to the stops of the driver form the corner points of an imagined equilateral triangle, so that during the commencement of a rotational movement into the driver a swinging motion of the locking ring is achieved in such a way, that the check noses by-pass radially inwards, so that the check noses reach out of the counter toothing of the fixed mounting.

For the hindrance free charging of the wide sides of the wedge segments by the force accumulator the locking ring has sparings for the passage of the spring legs, which charge this wedge segments at their wide sides, of an annular spring forming the force accumulator. Thereby the sparings in the locking ring are shaped advantageously as laterally reversed windows, whereas the limiting walls extending crosswise to the peripheral direction run inclined to the radials, in order to prevent the wedge segments following the direction of rotation at the undefined penetration into the sickle-shaped free space, which widens slightly during the adjusting movement, between the bearing point of the adjustable mounting and the bearing point of the fixed mounting. In addition to that the window type sparings of the locking ring are designed in such a way that during the adjusting movement of the driver, the locking ring remains secured in its matched position and is swung back so far from the toothing that the check noses can turn past the toothing at a distance and no ratched noise between the check nose and the toothing occurs.

For the axial position guard of the wedge segments between the bearing point of the mountings, the locking ring contains two supporting fingers projecting forward radially inwards, by which the wedge segments are secured in their axial position. In order to assure a defined after-running of the wedge segment rushing after the driver arm during the adjusting movement, the wedge segments at their wide sides contain in each case one recess closely encasing the eventual spring leg of the annular spring in the direction almost across the longitudinal extension of each wedge segment.

This invention is shown by an example of operation in the drawing and is explained in more detail afterward.

BRIEF DESCRIPTION OF THE DRAWINGS

In the drawings:

FIG. 2 illustrates the assembled hinge brace in a sectional view as per the line II—II of FIG. 3;

FIG. 3 illustrates the hinge brace shown in FIG. 2 in a vertical section as per the line III—III of FIG. 2;

FIG. 4 and 4a illustrate the central region of the hinge brace in a view seen on the fixed mounting, whereby the driver, however, is taken away and the adjusting and fixing device is in the state of locking;

FIG. 5 illustrates the driver removed from the hinge brace in a view seen on the side, from which the hub projects forward.

DESCRIPTION OF THE PREFERRED EMBODIMENTS

Figure 1:
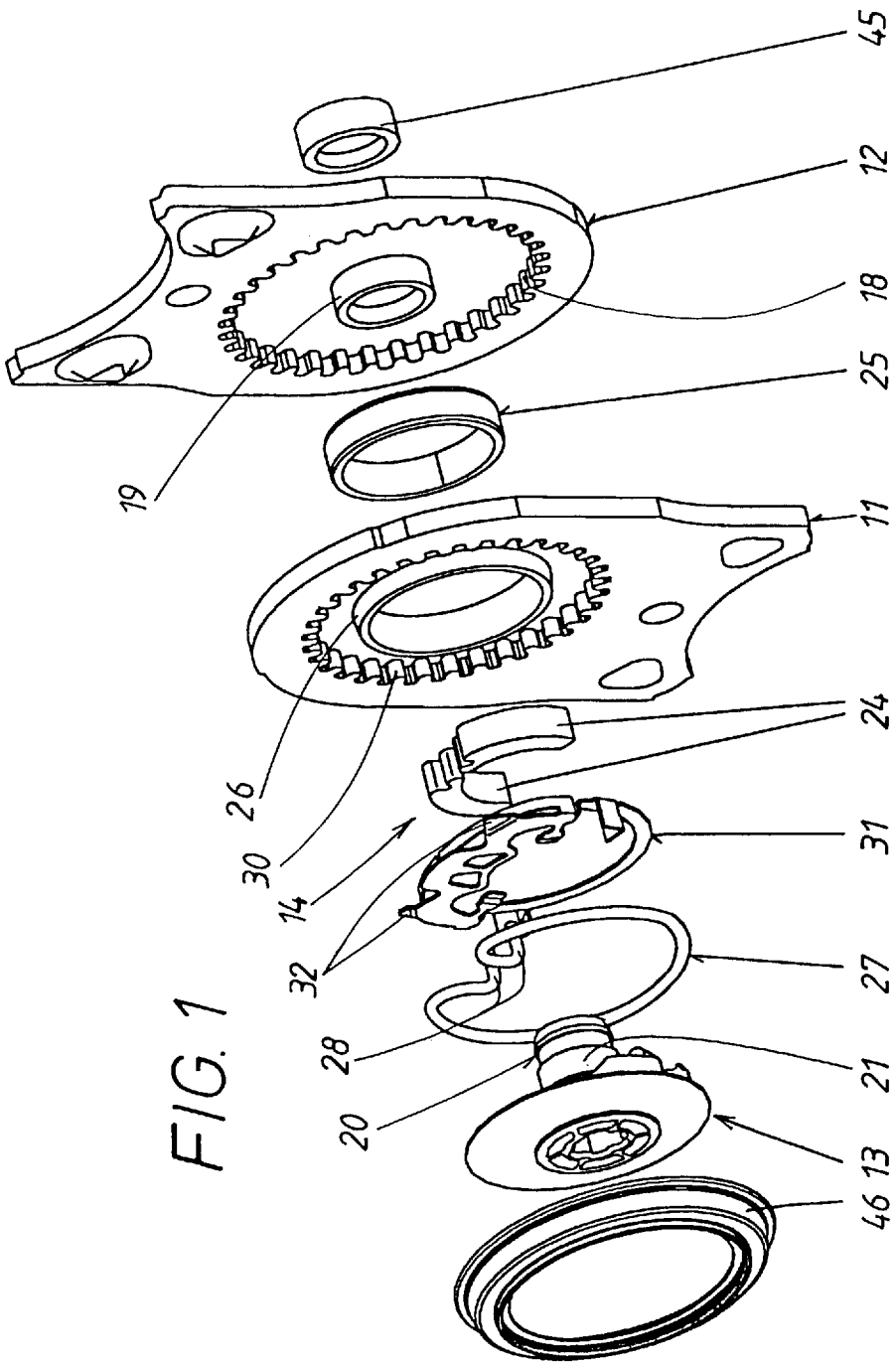
FIG. 1 illustrates the example of operation of an adjusting and fixing device to be arranged between the seat part and the back rest as hinge brace in a perspective explosion view.

The hinge brace 10 joining the seat part (not shown) with the back rest (also not shown) contains a fixed mounting 11, which can be joined with the seat part, and a mounting 12, which can be joined with the back rest. The mounting 12 is swivable vis-à-vis the mounting 11. The mountings 11 and 12 are joined with each other by a control element 13 containing a cam section. The control element 13 is designed as bush type driver 20 component of an adjusting and fixing device designed as gearing. Also a radial toothed wheel 15 formed, for example, by stamping from mounting 11 belongs to this adjusting and fixing device. The radially toothed wheel 15 has an external toothing 16, which combs with the internal toothing 18 of a gear rim 17 of the mounting 12, for example. The gear rim 17 is also formed by stamping. The diameter of the tip circle of the external toothing 16 is shorter by at least one tooth height than the diameter of the root circle of the internal toothing 18. The toothings 16 and 18 have teeth counts, which are different by at least one tooth, whereby the tooth count of the internal toothing 18 is greater than the tooth count of the external toothing 16. The displayed arrangement is chosen in such a way, that the internal toothing 18 can move on rolling contact with the external toothing 16.

The mounting 12 has, concentrical to its internal toothing 18, a collar pull 19, which forms a bearing point for the driver 20 designed as bush. This driver 20 made preferably of synthetic material includes a hub 21, which is rotably lodged in the collar pull 19 of the mounting 12, whereby a driver arm 22 arranged at radial distance from the hub 21 and partially overlapping the collar pull 19 is joined with the hub 21. The driver arm 22 again passes over similarly as the hub 21 at the external side of the hinge brace 10 into a covering disc 23 overlapping the hinge area. In the plane of the driver arm 22 at the collar pull 19, two wedge segments 24 are supported by their inner areas. Wedge segments 24 are supported at external surfaces thereof by a fixed bearing ring 25 that is located within collar pull 26 of the hinge part 11 thus another bearing point. While the narrow front sides of the wedge segments 24 are at a short distance from the driver arm 22 in the locked state of the mounting, the broad front sides of the wedge segments 24 are charged by the spring leg 28 of an annular spring 27 functioning as force accumulator in the sense of a spreading away from each other. These wedge segments produce, together with the collar pull 19 of the hinge part 12, a cam section. This cam section keeps internal toothing 18 engaged to the toothing 16 of the radial toothed wheel of the mounting 11 in a radial extension of the highest point of the cam. In the region of the wedge segments 24, locating faces 29 are given the shape in each case at the driver 20 adjacent to the covering disc 23 at both sides of the hub 21. The locating faces 29 annex to the driver arm 22, which projects opposite to the locating faces 29.

The hub 21 of the driver 20 has at its center a continuous, profiled location hole, in which a correspondingly profiled propagating rod (not shown) fits, in order to be able to propagate the rotational movement of the one mounting to the mounting situated at the other longitudinal side of the seat.

The radial toothed wheel 15 at the fixed mounting 11 as well as the gear rim 17 at the swivable mounting 12 are produced by stamping of a disc part from the mounting, whereby the toothings 16 or 18 engaged with each other are produced on the one side of the mounting 11 or 12, as the case may be, whereas on the other side of the eventual mounting in each case, an empty counter toothing is formed, of which only the counter toothing 30 of the fixed mounting 11 is of significance in the case of the present example of operation.

Figure 4A:
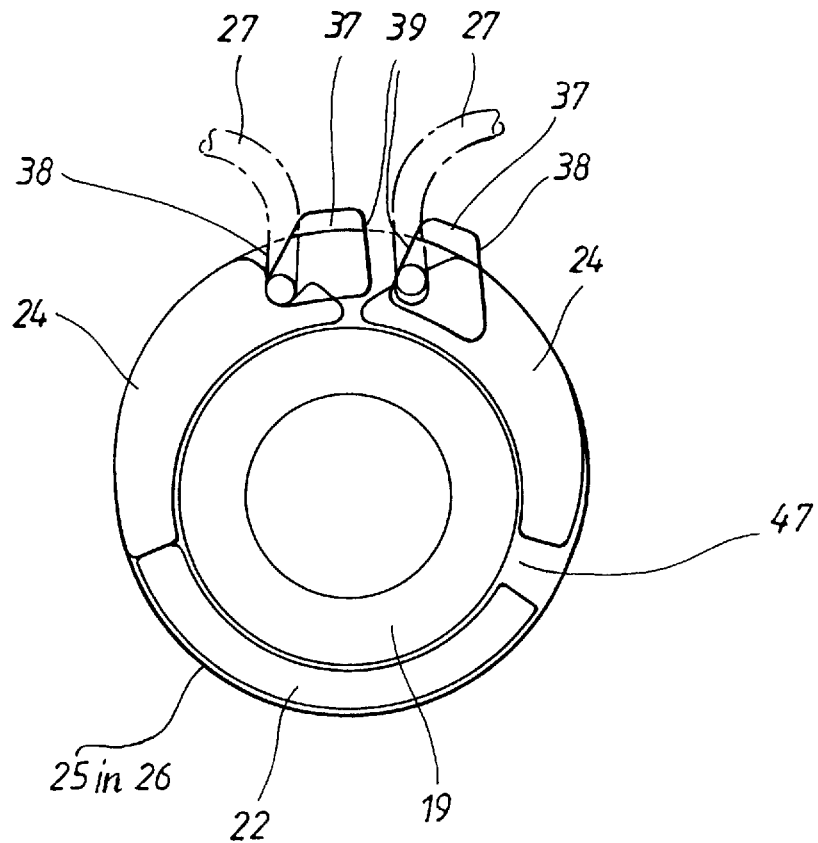
Figure 6:
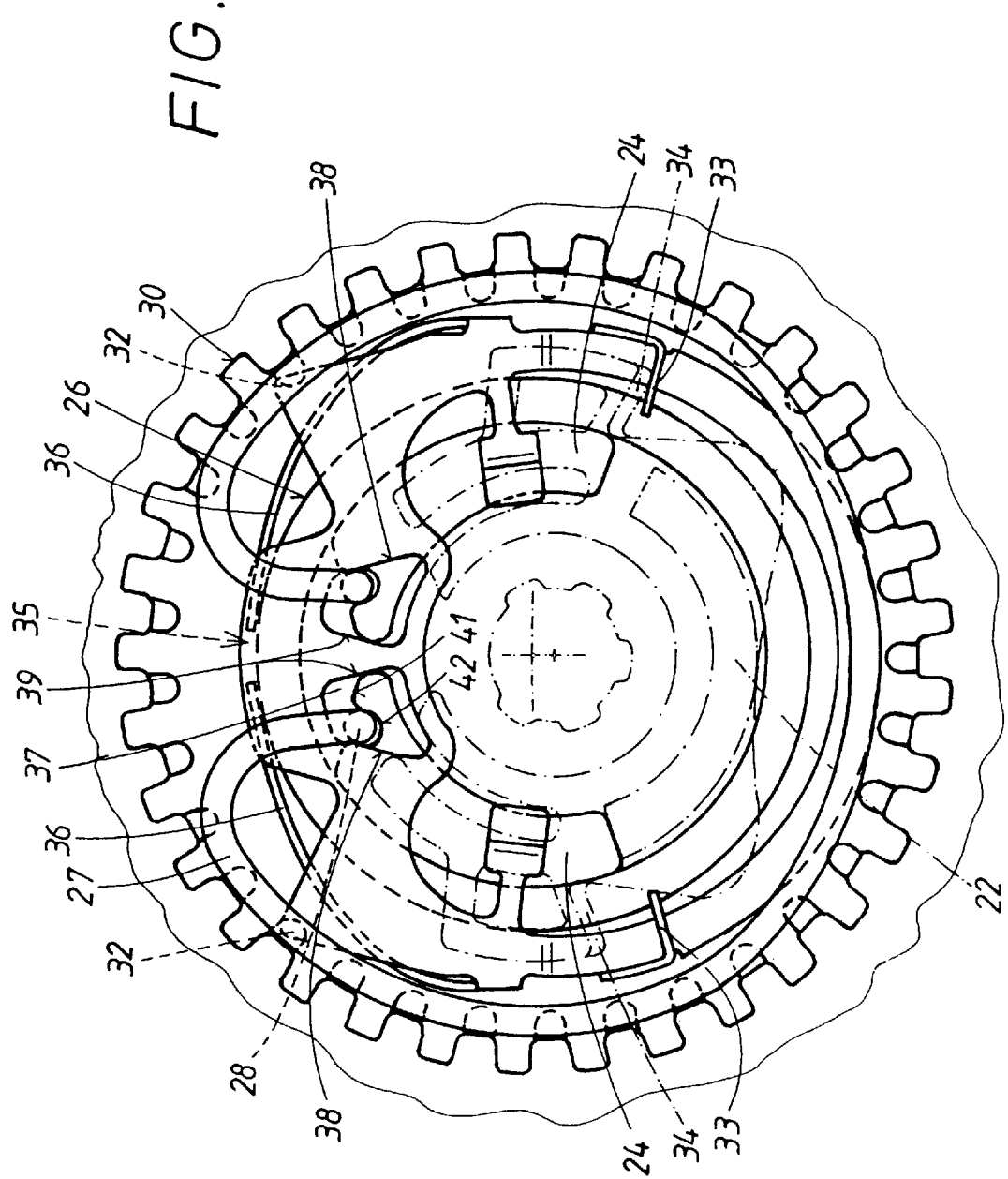
FIG. 6 illustrates the central region of the hinge brace in a display analogous to the FIG. 4, whereby the driver shown by dotted line is put into action for the sparing of the locking ring.

A locking ring 31 is situated in a radial plane axial between the wedge segments 24 and the covering disc 23 of the driver or the annular spring 27 situated before it. The locking ring 31 has two check noses 32 arranged at equal distance from the tooth engagement position at its side facing the tooth engagement position. The check noses 32 project over the outer periphery of the locking ring 31 and catch into the tooth gaps of the counter toothing 30 in the blocked case. On the side opposite to the tooth engagement position, the locking ring 31 has two supporting fingers 33 (projecting from its disc plane) arranged at a distance from each other. The supporting fingers are taken hold of stops 34 of the driver 20 functioning as adjusting elements 13 free from backlash. In addition, locking ring 31 has a spring element 35. The two supporting fingers 33 adjacent to stops 34 and the support center of spring element 35 form the corner points of an imaginary equilateral triangle 50 (FIG. 4). In the case of the displayed example of operation, the spring element 35 is formed by two plate spring legs 36, also identified as leaf springs, emerging sidewise from the locking ring. The plate spring legs are directed against each other with their free ends and are in location on the collar pull 26 forming the bearing point of the fixed mounting 11 (FIGS. 4 and 6). By the plate spring legs 36, the locking ring is kept in its engaged position in the counter toothing 30, as it is evident from FIGS. 2 and 4. The locking ring 31 has at its region adjacent to the tooth engagement position between the two check noses 32 sparings 37 for the passage of the spring legs 28 of the annular spring 27 pressing the wedge segments 24 away from each other. These sparings are formed as laterally reversed windows, the limiting walls 38 and 39 of which stretch themselves crosswise to the peripheral directions and run inclined to the radial. The function areas of the check noses 32 are parallel to the limiting walls 38, 39, by which it is assured that in the case of locking the thrust forces are started from wedge segments check as normal to the contact areas into the toothed wheel. The inclination of the check noses 32 and the limiting walls effect a radial force component in the locking direction of the locking ring 31. In the region of the gate position of the plate spring legs 36, supporting fingers 40 project from the inner side of the locking ring 31 over the wedge segments 24 towards inside in order to secure the wedge segments in their axial position (FIG. 4). Further, the springs 37 are shaped to prevent wedge segments 24 from penetrating into the sickle-shaped free space 47 (FIG. 4a).

The wedge segments 24 have at their broad sides 41 recesses 42 closely enclosing the spring leg 28 in the direction crosswise to the longitudinal stretching of each wedge segment 24. A ring section of the hub 21 rises above the ejected disc part of the swivable mounting 12. The hub 21 has a snap ring groove at the outer side, in which a clamp ring 45 is held, which rests at the outer side of the bearing point 19 formed by the collar pull. Finally, also in the case of this solution the elements forming the adjusting and fixing device are protected by a ring wheel 46 clamped at the covering disc 23 of the driver 20. The ring wheel 46 with a ring lip rests on the outer side of the mounting 11.

In the case of locking state evident from FIGS. 2 and 4, the check noses 32 engage in the tooth gaps of the counter toothing 30 of the outer toothing 16 of the radial toothed wheel 15 at the fixed mounting 11, and are kept in this locking state by the spring element 35 formed by the plate spring leg 36 of the locking spring 31. When a torque is exercised on the cam section 14, via the mounting 12 that is joined the back rest, over the bearing point (formed by the collar pull 19), then either the right or the left wedge segment 24 is exerted upon by a force. The exertion is transverse to the direction of force, inclined radial according to the direction of rotation as a result of the eccentric bearing of the gear rim 17 opposite to the radial tooth wheel 15. This force is transferred over the eventual spring leg 28 to the belonging limiting wall 38 of the sparing 37 of the locking ring 31.

The belonging check nose 32 rests at a tooth of the counter toothing 30 of the fixed mounting 11. Due to that it is effectively prevented that, due to the back rest load occurring like shock by shakings, this wears down in the case of continuous repeating stress. This situation is best evident from FIG. 4.

If now a rotational movement is started in the driver 21 for the back rest adjustment, then at once with the start of the rotational movement according to the direction of the rotational movement either the right or the left stop 34 begins to swivel the locking disc over the relevant supporting finger 33 in the corresponding direction of rotation against the restoring force of the plate spring legs 36 in such a way, that the locking ring 31 is pulled in the direction away from the tooth engagement position, so that the check noses 32 are released from the counter toothing 30, as it is evident from FIG. 6. The drive of the locking ring 31 results during the movement overbridging the play between the corresponding narrow sickle of the wedge segment 24 and the front side of the driver arm 22, so that the locking ring 31 takes up the position evident from FIG. 6 already at the moment of the striking the front side of driver arm 22 at the corresponding wedge segment 24. The situation evident from FIG. 6 resets itself during a turning of the driver 20 in the clockwise direction, whereby a slaving of the wedge segment 24 on the left side begins after the illustrated situation, when accordingly, also only the adjusting movement of the mounting 12 results, whereby the locking ring 31 is already transferred into the release position as it can be seen in FIG. 6. In the case of starting a direction of rotation against the clockwise direction the bearings on the right side of the central region (shown in FIG. 6) of the mounting appear.

As already indicated, the displayed and previously described operational design reproduces the object of this invention, which is by no means restricted only to it alone. Other designs of this invention are imaginable. Also all the characteristics evident in the description and in the drawings are essential to this invention, even if they are not explicitly claimed in the claims.

What is claimed is:

1. In an adjusting and fixing device for seats, in particular for the adjustment of a back rest with respect to a seat part, where a fixed mounting is arranged, which is joined with an adjustable mounting, which transfers an adjusting movement for the back rest over a gearing, which can be driven by an eccentric cam section of a shaft and defines the position of these mountings to each other, whereby the gearing is formed by a radial tooth wheel belonging to the fixed mounting and an inner gear rim of the adjustable mounting catching into this, and at the mountings counter toothings are arranged, whereby the cam section is formed by two wedge segments inclined against each other and surrounding a bearing collar of the adjustable mounting partly, the wedge sections being surrounded by a bearing ring of the fixed mounting, and narrow sides of the wedge segments can be charged by the arm of a driver designed as a bush, and a force accumulator provided between broad sides of the wedge segments to force the wedge segments away from each other, the improvement comprising:

a locking ring being arranged between the wedge segments and the driver, said locking ring having at least one check nose, which can be engaged in the counter toothing of the fixed mounting; and said check nose being kept in engaged position in the counter toothing by a spring element supporting itself at a bearing of the fixed mounting adjacent to the locking ring and which can be driven out of the counter toothing by stops of the driver during its rotational movement.

2. The adjusting and fixing device according to claim 1, wherein the locking ring is provided with two checking noses arranged at a distance from each other and projecting over its outer periphery; the checking noses have a distance from each other suitable for the simultaneous engagement in the tooth gaps of the counter toothings of the fixed mounting.

3. The adjusting and fixing device according to claim 1, wherein the locking ring contains two support fingers projecting almost perpendicular from its disc plane, the stops of the driver being adjacent to these fingers.

4. The adjusting and fixing device according to claim 3, wherein the spring element of the locking ring is formed from two leaf springs, each of said leaf springs having inner and outer ends, the outer ends of said two leaf springs being coupled to opposite sides of the locking ring.

5. The adjusting and fixing device according claim 4, wherein a center point between the inner ends of the leaf springs on the bearing point of the fixed mounting and the support fingers at the locking ring, which are adjacent to the stops of the driver, form the end points of an imaginary triangle.

6. The adjusting and fixing device according to claim 5, wherein the locking ring has sparings for the passage of the spring legs of an annular spring forming the force accumulator, said spring legs charging the wedge segments at broad sides thereof.

7. The adjusting and fixing device according to claim 6, wherein the sparings are designed as mirror imaged windows, limiting walls of the sparings extending at an incline relative to a radial of said locking ring, in order to prevent the wedge segment from entering a sickle-shaped free space, said free space being between the bearing point of the adjustable mounting and the bearing point of the fixed mounting.

8. The adjusting and fixing device according to claim 1, wherein the locking ring has two support fingers projecting radially inwards, by which the wedge segments are secured in their axial position.

9. The adjusting and fixing device according to claim 6, wherein the wedge segments have at broad sides thereof, in each case, one recess closely surrounding the spring legs of the annular spring.

* * * * *